United States Patent [19]

Hammond et al.

[11] E Re. 31,154

[45] Reissued Feb. 22, 1983

[54] FLEXIBLE DRIVE

[75] Inventors: James T. Hammond, San Leandro, Calif.; John H. Parks, Peoria, Ill.

[73] Assignee: Caterpillar Tractor Co., Peoria, Ill.

[21] Appl. No.: 85,185

[22] Filed: Oct. 15, 1979

Related U.S. Patent Documents

Reissue of:

[64] Patent No.: 4,121,476
Issued: Oct. 24, 1978
Appl. No.: 797,220
Filed: May 16, 1977

[51] Int. Cl.[3] ..... F16H 57/00; F16D 3/14

[52] U.S. Cl. ..... 74/411; 74/574; 464/82

[58] Field of Search ..... 74/411, 574, 414; 64/27 CS, 27 R, 27 L

[56] References Cited

U.S. PATENT DOCUMENTS

B 509,043 2/1976 Geislinger ..... 64/27 L
1,962,993 6/1934 Leece ..... 64/27 CS
2,724,252 11/1955 Schmall ..... 64/27 L
3,577,802 5/1971 Rumsey ..... 74/574

FOREIGN PATENT DOCUMENTS 726635 3/1955 United Kingdom .
2017259 10/1979 United Kingdom ..... 64/27 L

*Primary Examiner*—Allan D. Herrmann
*Assistant Examiner*—Conrad Berman
*Attorney, Agent or Firm*—Wegner, McCord, Dalton & Wood

[57] ABSTRACT

A variable rate frictional drive coupling is provided between a drive shaft and a driven member. The drive coupling will dampen torsional vibrations from the drive shaft and will transmit driving torque from said shaft to the driven member. The coupling comprises a cam and leaf springs positioned in such a way that as the shaft deflection increases, the load increases and the moment arm point of contact between the cam and the leaf springs changes such that no natural frequency is produced. The frictional forces between the leaves of the leaf spring change inversely to the spring force required to drive the driven member.

12 Claims, 3 Drawing Figures

FLEXIBLE DRIVE

Matter enclosed in heavy brackets [ ] appears in the original patent but forms no part of this reissue specification; matter printed in italics indicates the additions made by reissue.

BACKGROUND OF THE INVENTION

Flexible drives for driven members, such as governor flyweights, are necessary to protect the driven parts from fatigue and wear and to prevent the driven member from sensing false speed signals produced by drive vibrations. Heretofore, the response of the driven member was less than ideal when a flexible drive was used. If the flexible drive was soft enough to protect the driven parts, it was not stiff enough to permit the [drive] *driven* parts to respond to speed changes. If the flexible drive was stiff enough to permit the driven parts to respond to speed changes, it was so stiff as to permit undesirable damaging vibrations to pass through the [drive] *driven* parts causing excessive wear. The drive should filter out the torsional cyclic excitation superimposed into the basic rotation rate of the drive to allow a smooth, steady speed and yet provide sufficient torsional drive to transmit response to normal engine speed [chenge] *change* transient impulses. Current flexible drives have a natural frequency which will either match, exceed or be lower than the frequency of vibrations from the engine which cause the flexible drive to greatly magnify, reduce or directly transmit said vibrations to the driven member depending upon the spring rate to moment of inertia relationship and the amount of dampening [provide] *provided*. This invention, having no natural frequency, is unresponsive to cyclic excitation or vibration.

SUMMARY OF THE INVENTION

The present invention is directed to overcoming one or more of the problems as set forth above.

According to the present invention, a flexible drive coupling is provided between a drive shaft and a driven member, such as the flyweights of a governor, which comprises a cam and leaf spring connection that does not have a natural frequency. The coupling produces a variable load-deflection rate which combines with friction resulting in the lack of a natural frequency which dampens torsional vibrations from the engine. The coupling has zero lost motion and is resilient or firm enough to protect the driven parts and stiff enough to permit the driven parts to respond to engine speed changes.

The flexible drive is provided with a housing through which either a pair of axially aligned shafts or a pair of parallel shafts extend. One of the shafts is a drive shaft and has a cam secured thereto. Spring members engage opposite sides of the cam and in the case of parallel shafts, are seated in the inner surface of a gear member which encircles said cam and said spring members. A second gear member is carried by the second or driven shaft and meshes with the gear member on the first shaft such that an output member carried by the second or driven shaft will be actuated by rotation of the drive shaft which will rotate the cam, spring members and the meshing gears. In the case of axially aligned shafts, the drive shaft has a cam surface thereto with spring members engaging opposite sides of the cam. The spring members are seated in a member carried by the second shaft such that the drive shaft will rotate the second shaft through the cam and spring members.

BRIEF DESCRIPTION OF THE DRAWINGS

The details of construction and operation of the invention are more fully described with reference to the accompanying drawings which form a part hereof and in which like reference numerals refer to like parts throughout.

In the drawings.

DESCRIPTION OF THE PREFERRED EMBODIMENT

Figure 1:
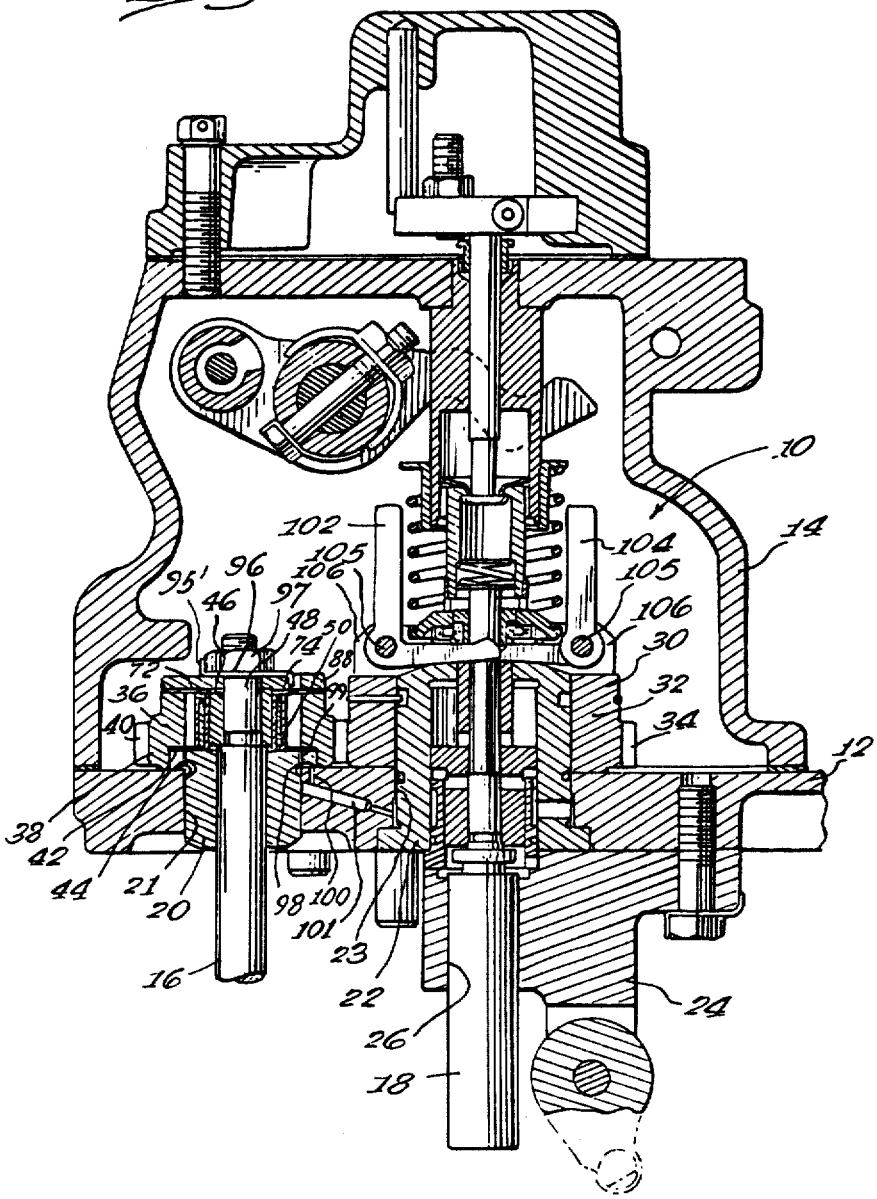
FIG. 1 is a vertical-sectional view of a governor having an improved flexible drive.

Referring to the drawings wherein like reference numerals refer to like parts throughout, FIG. 1 illustrates a governor 10 mounted on a base 12 and encased by a housing 14. Although a governor is shown and described with respect to the flexible drive, it is to be understood that the flexible drive of the present invention could be used with any drive member where the second or driven member is to be protected from vibrations, shocks and the like. A pair of vertically disposed parallel shafts 16 and 18 extend through the base 12 with the shaft 16 having a bearing 20 surrounding said shaft and seated in an opening 21 in said base 12. The shaft 16, which is a drive shaft, rotates freely about its longitudinal axis in the opening in said bearing 20.

A bearing 22 is seated in an opening 23 in said base 12 and encircles a portion of the shaft 18. A bracket 24 is bolted to the underside of the base 12 and has an opening 26 through which the shaft 18 extends. The shaft 18 is mounted primarily for reciprocation along its longitudinal axis. Within the housing 14, a gear 30 is concentrically disposed about the bearing 22 and comprises a conical sleeve 32 and a plurality of gear teeth 34 about the outer periphery of said sleeve 32. A gear 36 is concentrically disposed about shaft 16 and about a portion of bearing 20 and comprises a sleeve 38 having a plurality of gear teeth 40 formed on the outer periphery thereof. The gear teeth 40 on gear 36 mesh with gear teeth 34 on gear 30 so that rotation of gear 36 will rotate gear 30. The sleeve 38 of gear 36 has an annular recess 42 formed in its base in which recess 42 a collar 44 on the bearing 20 nests. The gear 36 rotates about its axis in sliding contact with the collar 44 on the bearing 20.

Figure 3:
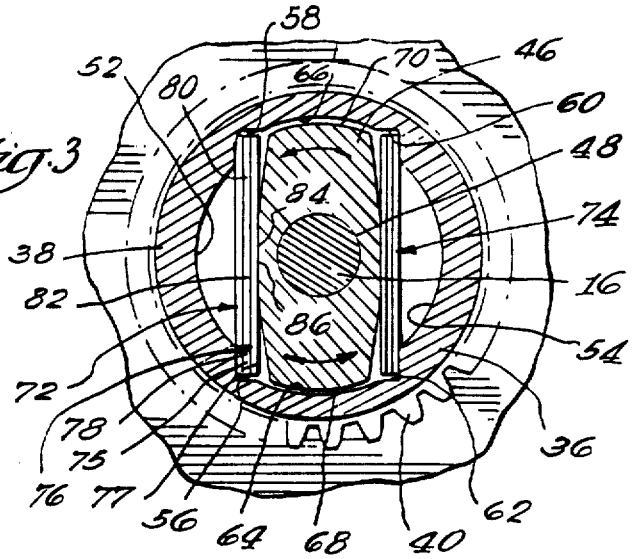
FIG. 3 is a cross-sectional view taken along the line 3—3 of FIG. 2.
Figure 2:
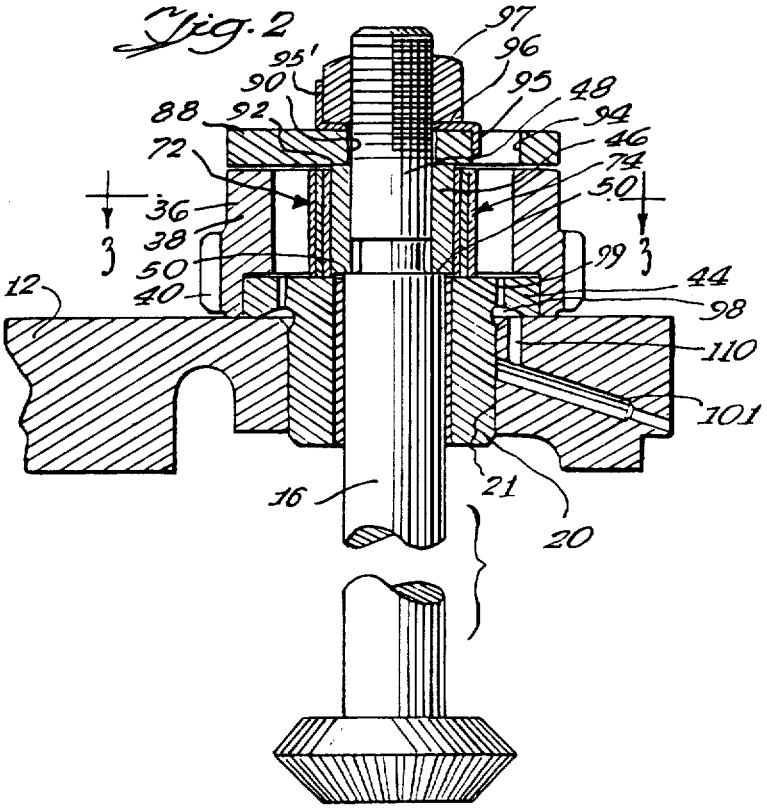
FIG. 2 is an enlarged, broken away, sectional view of the improved flexible drive of FIG. 1.

A truncated elliptical member or cam 46 is positioned around the reduced diameter end portion 48 of the shaft 16 and is in axial engagement with a shoulder 50 formed by said reduced end portion 48 on the shaft. As can best be seen in FIG. 3, the sleeve 38 has an internal diameter producing diametrically opposite arcs 52,54 with four notches 56,58,60,62 formed in said sleeve, one on each end of each arc 52 and 54. The sleeve 38 has two crowned arcs 64,66 between the ends of the arcs 52,54 which crowned arcs 64,66 have a radius of curvature longer than the radius of the arcs 52,54 and which [drowned] *crowned* arcs 64,66 are spaced from and are concentric with the internal truncated ends 68,70 of the cam member 46. The distance from the center of the cam member 46 to the truncated ends 68,70 is greater than the radius of the arcs 52,54 so that the cam 46 cannot rotate inside the internal opening of the gear 36.

A pair of spring members 72,74 are provided with each spring member being shown as consisting of three leaves 75,76,77 which leaves are juxtaposed and are of such a length that the respective end portions 78 and 80 of the springs 72,74 seat in the notches 56,58 and 60,62 with the midportion 82 of the springs 72,74 in contact with the crown portion 84 of the cam 46 near the midportion 86 thereof. The springs 72,74 are made of an appropriate spring steel, or the like, and can be designed to be either stiff or soft or any intermediate degree of stiffness so as to accomplish one of the intended purposes of the coupling. Although it is preferred that each leaf 75,76,77 be of the same material and rating, it is recognized that each leaf could be of a different rating to provide a desired spring rating to the composite springs 72, 74.

A thrust washer 88, which has a central aperture 90, is assembled over the reduced end portion 48 of the shaft 16 so that the central portion of the washer 88 contacts the one axial end face 92 of said cam 46. The washer 88 has a slot 94 formed radially outward from the midportion thereof such that a tang 95 on a lock washer 96 is bent into the slot 94 when the lock washer 96 is assembled on the end portion of the shaft 16. A nut 97 is threaded on the end of the shaft 16 to urge the two washers 88,96 against each other and against the end 92 of the cam 46 so as to urge the cam 46 tightly against the shoulder 50 on the reduced end portion 48 of the shaft 16. A second tang 95', on the opposite end of washer 96, is bent up and against one of the flats on the nut 97 to lock the thrust washer 88 in place.

At the time that the cam 46 is locked between the washer 88 and the shoulder 50 on the shaft 16, the planes of the springs 72,74 lie substantially parallel to each other and parallel to the axis of the shaft 16 with the end portions 78,80 in the notches 56,58 and 60,62 formed on the inner periphery of the gear 36. A lubricating passage 98 is formed between the collar 44 of the bearing 20 and the base 12 with a port 99 communicating between said passage 98 and the open space in the gear 36 between the springs 72,74, the cam 46 and the inside of the sleeve 38 of said gear 36. A second port 100 extends between said passage 98 and an angled port 101 which extends from said port 100 to the port in the opening 21 in the base 12. Lubrication under pressure is provided to the ports 101,100,98,99 so as to provide lubrication to the cam 46, springs 72,74 and the other moving parts of the system.

Since the structure and operation of the governor 10 is well known in the art, no attempt will be made to describe in detail the various elements thereof or how the governor operates with respect to the rack for controlling the fuel to the engine. For the purpose of the present discussion, suffice it to say, that a pair of flyweights 102,104 are pivotally secured at pivots 105 to the upwardly extending ears 106 formed on the gear 30 so that the weighted ends of the flyweights [102-104] *102,104* will pivot outwardly about the axis of the pivots 105 upon rotation of the gear 30.

In conventional operation of a governor, the drive shaft 16 will drive the gear 36 so that the meshing teeth 40,34 will drive *the* gear 30 about the axis of the shaft 18. The flyweights 102,104 on the sleeve 32 of gear 30 will actuate depending upon the speed of the shaft 16 so that the weighted portion will swing out, raising the lower portion of the flyweights to reciprocate the shaft 18 thereby stabilizing the operation of the engine.

The flexible drive of the present invention incorporates the cam member 46 and leaf springs 72,74 to form the coupling between the shaft 16 and the shaft 18. As the shaft 16 rotates, the cam member 46 will rotate therewith in contact with said springs 72,74. Depending on the rotating force applied to the shaft 16 and cam 46, the cam 46 will have a tendency to rotate slightly with respect to the spring means 72,74 which will increase the moment arm and will load the spring means stronger against the opposite contacting faces of the cam member 46. The springs 72,74 will transmit the rotating force of the shaft 16 to the gear 36, which in turn will drive gear 30 and the shaft 18. Vibrations of the engine or of the drive shaft 16 will be transmitted to the cam member 46. The cam member 46, since it is isolated from the gear 36, will attempt to transmit the vibrations through the springs 72,74 to the gear 36, but the springs 72,74 dampen the vibrations so that the vibrations are not transmitted on through the system to the shaft 18. The construction of the cam 46 and the springs 72,74 is such that an exponentially variable load deflection ratio exists and said cam 46 and springs 72,74 will not have a natural frequency resonant condition. That is, there is no natural frequency in the cam 46 and springs 72,74 and, therefore, there is no matching of frequencies between the vibrations in the shaft 16 and the vibrations in the shaft 18. The coupling, with the gradually shifting loading between the cam 46 and the springs 72,74, creates a variable rate frictional drive coupling between the drive shaft 16 and the shaft 18 which, in the example illustrated, dampens vibrations from the engine to the governor.

It will be noted that the moment arm from the axis of the drive shaft 16 to the contact point 84 between the cam 46 and the springs 72,74 will vary depending upon the force being transmitted from the drive shaft 16 to the drive shaft 18. As the cam member 46 rotates relative to the springs 72,74, the moment arm increases thereby increasing the deflection of the springs 72,74 which increases the loading force by the springs 72,74 against the cam 46. As the shaft deflection increases, the load between the cam 46 and the springs 72,74 increases and the moment arm point of contact between the cam 46 and the leaf springs 72,74 changes such that there is an exponentially variable load deflection ratio in the spring system.

The frictional force between the leaves 75,76,77 of the springs 72,74 and between the leaf 77 of the springs 72,74 and the cam 46, changes directly proportional to the spring force required to drive the governor flyweights 102, 104. That is, as the drive is transmitted from the cam 46 through the spring members 72,74, the frictional forces between the leaves 75,76,77 and between the inner leaves 77 and the cam 46 change inversely to the amount of force transmitted through the coupling to drive the flyweights 102,104. The moment arm between the axis of the shaft 16 and the contact 84 between the cam 46 and the springs 72, 74 [varys] *varies* as the force increases, but it will be noted that there is no lost motion between the drive shaft 16 and the gear 36 so that the rotational force from the drive shaft 16 is transmitted without lost motion to the flyweights 102, 104 to produce maximum sensitivity to the governor 10 while still maintaining the benefits of the flexible drive. The spring members 72,74 dampen the instantaneously variable loads from the drive shaft 16, such as torsional impulses from each firing stroke of the engine which, if transmitted directly through the drive shaft 16 to the flyweights 102, 104, would cause the flyweights 102,104 to respond and thus upset engine stability. The frictional contact between the springs 72,74 and the cam 46 provides sufficient drive force for the governor to respond to transient speed changes resulting from changes to throttle position or engine output load.

Although each of the spring members 72,74 is shown with three leaves 75,76,77, it is to be understood that one or more leaves on each side are contemplated and will function satisfactorily depending on the design parameters desired.

The thickness and resistance of the leaves 75,76,77 of the springs 72,74 can be computed to match the mass inertia of the flyweight system and provide a drive which is stiff enough to permit the flyweights 102,104 to respond to immediate speed changes in the engine. The surfaces of the leaves 75,76,77 of the springs 72,74 can receive different degrees of finish so as to change the frictional forces between the leaves 75,76,77 of the springs 72,74 thereby stiffening or softening the coupling effect between the drive shaft 16 and the driven shaft 18.

Although I have shown and described my improved flexible drive with respect to a pair of parallel shafts 16 and 18, it is to be understood that the flexible drive can be used with axially aligned or concentric shafts wherein the cam is mounted on one shaft with the spring members engaging the cam and engaging notches or the like in a sleeve mounted on the second shaft. Vibrations and load fluctuations from the drive shaft will be dampened by the flexible drive so as to prevent transmission of said vibrations and fluctuations to the driven shaft.

The flexible drive coupling has application beyond use on governors of diesel engines and the like. For instance, the flexible coupling could be used in blower drives, electric sets and the like. It is applicable in any location where a drive shaft receives vibrations and load fluctuations, which vibrations and load fluctuations can have a deleterious effect on a piece of equipment that is driven by the rotation of the drive shaft. Under those circumstances, the flexible coupling of the present design can be incorporated in the drive line so as to reduce or eliminate the vibrations and shock loads transmitted to the piece of equipment.

The embodiments of the invention in which an exclusive property or privilege is claimed are defined as follows:

1. A flexible drive having a housing, a [pair of shafts rotatably] *drive shaft* rotatably mounted in said housing, [one of said shafts being rotatably driven,] cam means secured to said [rotatably drive] *rotatable drive* shaft, elongate spring means in engagement with [a portion of the opposite sides of] *said* cam means, gear means encircling said cam means and said spring means, [the end portions of] said spring means *having end portions* seating in [the] *an* inner surface of said gear means, [a] second gear means [carried by said other of said shafts, driven] *mounted in said housing and meshing with said first gear means,* means [carried] *driven* by said second gear means [and operatively connected with said second shaft whereby], said [rotatably driven] *rotatable drive* shaft rotates said [driven] means *driven by said second gear means* through said cam means and spring means.

2. A flexible drive as claimed in claim 1 wherein said cam means is essentially [elliptical in shape] *shaped like an ellipse*, and said spring means are at least two elongate flat springs disposed in planes substantially parallel to each other and parallel to the major axis of said ellipse and contacting said cam means on the long sides of the ellipse.

3. A flexible drive as claimed in claim 1 wherein said spring means comprises a pair of springs, each spring having a plurality of leaves in contacting side-by-side relationship.

[4. A flexible drive as claimed in claim 1 wherein said shafts are disposed parallel to each other.]

5. A flexible drive as claimed in claim 2 wherein means are provided on said [rotatably driven] *rotatable drive* shaft for frictionally locking said cam means to said shaft.

6. A flexible drive comprising a housing having a base, a [pair of shafts] *shaft* in said housing [, one of said shafts] extending through said base, said [one of said shafts] *shaft* being [drive] *a drive shaft* and receiving rotational and vibrational forces from a prime mover, cam means disposed inside said housing and secured to said [driven] *drive* shaft for rotation therewith, elongate spring means in engagement with a portion of the opposite sides of *the* cam means, a cylindrically-shaped gear means encircling said cam means and said elongate spring means and having gear teeth on the outer periphery thereof, and [end portions of] said spring means *having end portions* seating in notches formed in the inner surface of said gear means, a mating set of gear teeth formed on [a] second gear means [carried by said other end of said shafts] *rotatably mounted in said housing*, and said second gear means drivingly connected to driven means associated with [said second shaft] *the housing* whereby said drive shaft rotates said driven means through said cam means and spring means.

7. A flexible drive as claimed in claim 6 wherein said cam means is a truncated ellipse, and said spring means are at least two elongate flat springs disposed in planes parallel to each other and parallel to the major axis of said ellipse and contacting said cam means on the long sides of the ellipse.

[8. A flexible drive as claimed in claim 6 wherein said pair of shafts are parallel to each other and are mounted in said base of said housing.]

[9. A flexible drive as claimed in claim 6 wherein said pair of shafts are axially aligned with each other.]

10. A flexible drive as claimed in claim 7 wherein a thrust washer is seated on said cam means and has a slot formed therein offset from the midportion thereof, a lock washer is seated on said shaft and has one [tan] *tang* seated in said slot, and means having a second tang of said lock washer seated against a flat surface thereof and frictionally locking said thrust washer against said cam means and against a shoulder on said *drive* shaft.

11. A flexible drive as claimed in claim 7 wherein said spring means comprises a pair of springs, each spring having a plurality of leaves in juxtaposed relationship.

12. In a governor drive having a base, a pair of shafts extending through said base and being disposed parallel to each other, [each] *one* of said shafts having a *first* gear meshing with [each] *a second gear surrounding a portion of the* other *of said shafts, said* one of said shafts being [driven] *a drive shaft* and receiving rotational and vibrational forces from a prime mover, a pair of flyweights [carried] *operatively driven* by the *second* gear on said other shaft, cam [mean] *means* carried by said [driven] *drive* shaft for rotation therewith, elongate spring means seated in said *first* gear on the [driven] *drive* shaft and engaging with a portion of the [opposite sides of] cam means, whereby rotation of said [driven] *drive* shaft will urge said cam means against said spring means to drive said [gear] *first and second gears* and actuate said flyweights.

13. In a governor drive as claimed in claim 12 wherein said cam means is [elliptical] in *the* shape *of an ellipse*, and said spring means are at least two elongate flat springs disposed in planes substantially parallel to each other and parallel to the major axis of said ellipse and contacting said cam means on the long sides of the ellipse.

14. In a governor drive as claimed in claim 13 wherein said spring means comprises a pair of springs, each spring having a plurality of leaves in side-by-side contact with each other.

*15. A flexible drive having a housing with a rotatable drive shaft, cam means secured to said rotatable drive shaft, elongate spring means in engagement with said cam means, gear means encircling said cam means and said spring means, said spring means having end portions seating in an inner surface of said gear means, driven means carried by said housing and operatively connected with said gear means, said rotatable drive shaft rotating said driven means through said cam means and spring means.*

* * * * *